US007516647B2

(12) United States Patent
Kluth et al.

(10) Patent No.: US 7,516,647 B2

(45) Date of Patent: Apr. 14, 2009

(54) DEVICE AND METHOD FOR ASSIGNING KNOCK SENSORS TO CYLINDERS OF AN INTERNAL COMBUSTION ENGINE

(75) Inventors: Carsten Kluth, Stuttgart (DE); Werner Haeming, Neudenau (DE); Wolfgang Fischer, Gerlingen (DE); Federico Buganza, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 11/604,982

(22) Filed: Nov. 27, 2006

(65) Prior Publication Data

US 2007/0137284 A1 Jun. 21, 2007

(30) Foreign Application Priority Data

Dec. 9, 2005 (DE) ....................... 10 2005 058 863

(51) Int. Cl.
*G01M 15/12* (2006.01)

(52) U.S. Cl. ................................... 73/35.03; 73/114.07

(58) Field of Classification Search ................ 73/35.01, 73/35.03, 35.06, 114.02, 114.07
See application file for complete search history.

(56) References Cited

U.S. PATENT DOCUMENTS

| | | | | |
|---|---|---|---|---|
| 6,769,402 | B2 * | 8/2004 | Franke et al. | 123/406.16 |
| 6,805,097 | B2 * | 10/2004 | Sauler et al. | 123/406.21 |
| 2002/0073766 | A1 * | 6/2002 | Sauler et al. | 73/35.04 |
| 2003/0154958 | A1 * | 8/2003 | Franke et al. | 123/406.16 |
| 2006/0200299 | A1 * | 9/2006 | Torno et al. | 701/111 |

FOREIGN PATENT DOCUMENTS

DE 100 04 166 8/2001

* cited by examiner

*Primary Examiner*—Eric S McCall
(74) *Attorney, Agent, or Firm*—Kenyon & Kenyon LLP

(57) ABSTRACT

A device and a method for assigning at least two knock sensors to at least two cylinders of an internal combustion engine are provided. An arrangement for comparison is provided, which implements the assignment of the knock sensors to the cylinders by comparing at least two characteristic acoustic signals.

10 Claims, 1 Drawing Sheet

DEVICE AND METHOD FOR ASSIGNING KNOCK SENSORS TO CYLINDERS OF AN INTERNAL COMBUSTION ENGINE

BACKGROUND INFORMATION

A device and a method for knock detection of an internal combustion engine are described in German Patent Application No. DE 100 04 166. Here, a plurality of knock sensors are assigned to a plurality of cylinders of an internal combustion engine. The knock sensors are configured to analyze acoustic signals generated inside the cylinders. However, there is a fixed mutual assignment of cylinders and knock sensors.

SUMMARY OF THE INVENTION

The device and the method according to the present invention have the advantage that an automatic assignment of the knock sensors to the cylinders of the internal combustion engine takes place. This is accomplished in an especially simple manner by providing comparison means, which compare two characteristic acoustic signals of the cylinders to each other and implement the assignment of the knock sensors to the cylinders on the basis of these signals. This device and method make it possible to prevent a faulty assignment of the sensors, which leads to a deterioration of the knock detection and thereby either to engine damage or to disadvantageous consumption due to a then required operation with a large margin with respect to the knock limit. The operating reliability of the internal combustion engine is increased as a result.

The comparison of the acoustic signals is implemented in an especially uncomplicated manner by analyzing a signal strength of the characteristic acoustic signals. Such an analysis of the signal strength may be implemented in a particularly simple manner by examining the measured signal levels. In an advantageous manner, however, an energy examination of the signal takes place, i.e., it is analyzed how large the amplitudes are and for what time period the amplitudes occur. This may be done very easily by rectifying and integrating the signals. Alternatively, two methods for analyzing the signals are possible. In a first alternative, signals from different cylinders are analyzed, which are measured at one and the same knock sensor. The measuring results in this procedure therefore come from one and the same knock sensor, so that different measuring accuracies of the various knock sensors are not an issue. As a second alternative method, it is possible to analyze signals that are measured by two different knock sensors, but come from one and the same cylinder. Fluctuations in the generation of the acoustic signals in the cylinders, which may differ from cylinder to cylinder, are of no account in this method. Both methods therefore have their special advantages and may both also be used simultaneously or one after the other should this appear to be desirable for reasons of evaluation reliability.

The assignment may optionally be implemented by an external request or otherwise upon each startup of the internal combustion engine. If the assignment takes place upon each startup of the internal combustion engine, no fixed assignment of knock sensors to the cylinders will be provided from the outset. It will then in each case be determined in an individually adapted manner during continuous operation. As an alternative, using an external signal, an assignment may be made or an existing assignment examined whenever required. This may be triggered either in a repair or upon initial operation of the vehicle, or from time to time, with the aid of an external signal in each case.

DETAILED DESCRIPTION

Figure 1:
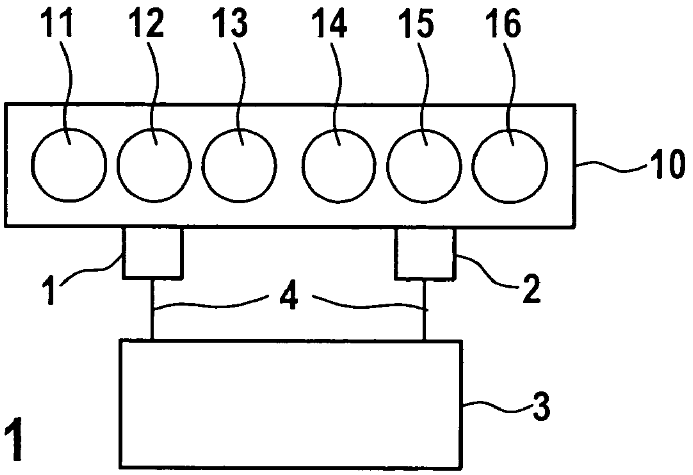
FIG. 1 shows an internal combustion engine having cylinders and knock sensors.

FIG. 1 shows a schematic representation of an internal combustion engine 10 having six cylinders 11, 12, 13, 14, 15, 16. Cylinders 11-16 of the internal combustion engine are combined into two cylinder banks, i.e., cylinders 11-13 as cylinder bank 1, and cylinders 14-16 as cylinder bank 2. Disposed in the immediate vicinity of cylinder bank 1, 11-13, is knock sensor 1, and situated in the immediate vicinity of cylinder bank 2, 14-16, is knock sensor 2. Knock sensors 1 and 2 are connected to an engine control device 3 by corresponding lines 4.

Internal combustion engine 10 is operated in such a way that one cylinder of cylinder bank 1 and one cylinder of cylinder bank 2 is always alternately used for power generation with the aid of a combustion process. The combustion processes in the cylinders drive a crankshaft, which executes two rotations during a working cycle of the internal combustion engine, i.e., a crank angle of 720°. The working cycle here is the consecutive operation of all cylinders 11-16 in the course of which a four-stroke Otto engine usually executes two crankshaft rotations (=720° CA). In a six-cylinder internal combustion engine, six combustion processes take place in the cylinders during this 720° working cycle, in a four-cylinder internal combustion engine there are four combustion processes, etc. The combustion processes and the related activations of valves and the like generate acoustic signals in each of the cylinders, which are characteristic for a particular process in one of cylinders 11-16. Such a characteristic process is, for instance, the combustion process itself, which generates an acoustic signal as a result of the rapid (explosion-like) pressure rise. Another characteristic signal is, for example, the closing of an intake valve, which then generates an acoustic closing noise shortly before combustion. These characteristic acoustic signals are able to be verified by knock sensors 1 and 2.

Figure 2:
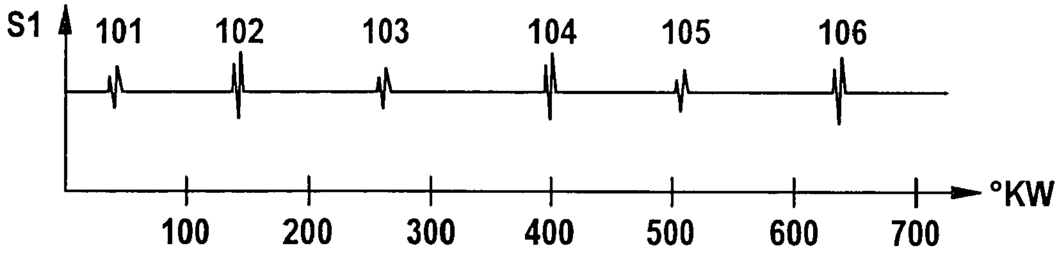
FIG. 2 shows a signal characteristic at a first knock sensor.

In FIG. 2, signal characteristic S1 of knock sensor 1 has been schematically plotted with respect to crank angle degree KW. As can be seen, six characteristic signals are measured in one working cycle, that is to say, in a range of 720° crank angle. In the illustration of FIG. 2, measured signals S1 are idealized to the effect that no amplitudes are measurable between the characteristic signals. As a matter of fact, however, there are also fluctuations in the signal level between characteristic signals, which, however, clearly differ in their amplitudes from the characteristic signals illustrated here. For the further discussion it will now simply be assumed that these characteristic signals represent valve noise, i.e., noise that is produced by driving the intake valves very rapidly onto the valve seat. In a first time interval, shortly before 50° CA, a first characteristic noise 101 is measured; shortly before 150° CA a second characteristic noise 102 is measured; shortly before 270° CA, a third characteristic noise 103 is measured; at approx. 400° CA, a fourth characteristic noise 104 is measured; at approx. 510° CA, a fifth characteristic noise 105 is measured, and at approx. 630° CA, a sixth characteristic noise 106 is measured. The crank angles at which the characteristic noises occur are very well known in a real internal combustion engine, so that, for instance, interfering other signals are able to be suppressed even if a measurement takes place in the particular angle range only.

In FIG. 2, measuring signals S1 of knock sensor 1 have been plotted. Characteristic noise 101 is a characteristic noise that comes from a cylinder of cylinder bank 2 such as cylinder 14. Characteristic noise 102 is a noise coming from cylinder bank 1 such as from cylinder 11. Characteristic noise 103 is a signal from cylinder bank 2 such as cylinder 15. Characteristic signal 104 is a signal from cylinder bank 1 such as cylinder 12. Characteristic signal 105 is a characteristic signal from cylinder bank 2 such as cylinder 16. Characteristic noise 106 is a signal from cylinder bank 1 such as from cylinder 13. As can be gathered from FIG. 2, the characteristic signals which are measured by knock sensor 1 and originate from cylinder bank 2, i.e., signals 101, 103, 105, are each considerably weaker than the signals that originate from cylinder bank 1, i.e., signals 102, 104 and 106. This has its cause simply in the different distances of knock sensor 1 with respect to the individual cylinder banks 1 and 2. The characteristic signals of cylinder bank 2 must travel a considerably longer distance within internal combustion engine 10 and are damped to a correspondingly greater degree than the characteristic signals from cylinder bank 1. In FIG. 2, this is of course shown in idealized form since random fluctuations of the signal level are not illustrated. By comparing the signal levels it is therefore relatively easy to determine if knock sensor 1 has just received a signal from cylinder bank 1 or from cylinder bank 2. To this end, it is merely necessary to compare a signal from cylinder bank 1 to a signal from cylinder bank 2.

Two knock sensors have been provided for knock control in the internal combustion engine shown in FIG. 1. Two knock sensors are provided here primarily in order to have one knock sensor in each case disposed in the immediate vicinity of cylinders 11-16 and to thereby be able to measure a knock signal of the cylinders as precisely as possible. By increasing damping of the knock signal with increasing distance between cylinder and knock sensor, the detection of knocking combustions becomes more difficult. It is therefore desirable that there be, at all times, a clear assignment of the knock sensors to the cylinders situated immediately adjacent. Such an assignment may naturally be provided from the outset. However, during repairs or in the course of production of the vehicle, it may happen that the corresponding connection cables 4 to knock sensors 1, 2 are switched, with the result that knock sensor 1 is used to measure the knock signals from cylinder bank 2, and knock sensor 2 is used to measure the knock signals from cylinder bank 1. This leads to a considerable deterioration of the quality of the knock measurement. According to the present invention, it is suggested to effect correct assignment of knock sensors 1, 2 to the cylinders or to check an existing assignment by comparing at least two characteristic signals. An assignment of knock sensor 1 to cylinder banks 1 and 2 is possible on the basis of the signal sequence alone, as it is shown in FIG. 2. To this end, the signal strength of consecutive signals is compared.

For instance, an evaluation of the signal strengths of characteristic signals 101-106 may be carried out by simply comparing the peak value to each other, i.e., the maximum amplitude of characteristic signals 101-106. Another possibility for analyzing the signal strength is to analyze the energy content of the characteristic signals. Such an analysis of the energy content may be carried out in that, for instance, characteristic signals 101-106 are rectified in each case and the rectified signal is then integrated. Given such rectification and integration, it is not only the strength of the amplitude, but additionally also the time interval of the amplitude that is therefore taken into account. Another possibility for determining the signal strength of the characteristic signals is an energy calculation in the frequency range, for instance by a Fourrier transform. The energies of the different frequency ranges may then be combined with each other, such as added.

Purely theoretically, such an assignment may already be implemented by comparing two signals such as first signal 101 with second signal 102. Due to the greater signal strength of signal 102 it is clear that this signal is coming from cylinder bank 1, i.e., that knock sensor 1 must be assigned to the cylinders whose characteristic signals are signals 102, 104, 106. The second sensor would then analogously be assigned to the cylinders that generate characteristic signals 101, 103 and 105. However, since the analysis of only two characteristic signals could have relatively large errors due to fluctuations of the signals or due to fluctuations of background noise, it is desirable to analyze additional signals. For instance, by dividing two consecutive signal strengths in each case, it is possible to form a comparison value. If the signal strength of signal 101 is divided by the signal strength of signal 102, the signal strength of signal 103 is divided by the signal strength of signal 104, and the signal strength of signal 105 is divided by the signal strength of signal 106, a value that is below 1 is generally calculated. If such a value occurs consecutively in a multitude of combustion processes, it would then be an indication that knock sensor 1, for example, is to be assigned to the respective second signal strengths, which form the denominator of the fraction.

In the case of two knock sensors, it is sufficient to compare two signals or two signal groups to each other. If, for instance, three knock sensors were to be assigned to cylinders in a corresponding manner, more than two signals or signal groups would have to be compared to each other. In any event, at least two signals or signal groups must be compared to each other in order to effect an assignment of the at least two knock sensors to the at least two cylinders of the internal combustion engine.

Figure 3:
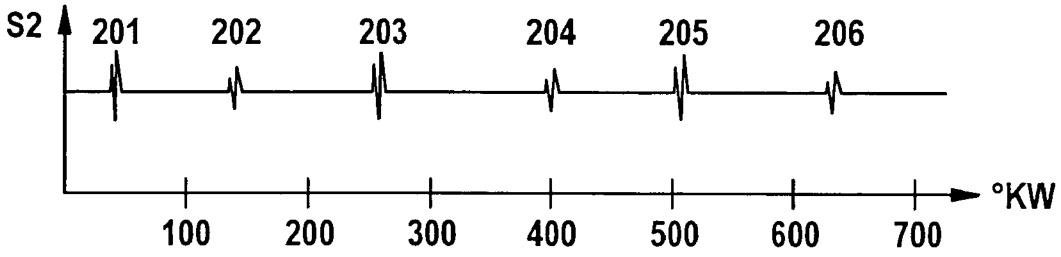
FIG. 3 shows a signal characteristic at a second knock sensor.

In FIG. 3, the signal sequence as it is measured at knock sensor 2 is illustrated analogously to the illustration in FIG. 2. Measured signal S2 shows a characteristic signal 201-206 at the same crank angles as in FIG. 2. Also like in FIG. 2, the consecutive signals differ in their signal strengths in such a way that a slightly weaker signal always follows a slightly stronger signal. By comparison with FIG. 2 it can be gathered that, whenever a stronger signal was present in FIG. 2, a weaker signal occurs in FIG. 3, and when a weaker signal occurs in FIG. 2, a stronger signal occurs at the corresponding crank angle in FIG. 3. This is due to the fact that, for knock sensor 2, the signals of the second cylinder bank naturally tend to have higher signal strengths than the signals of cylinder bank 1. In the same way as in FIG. 2, an assignment of the knock sensors to the cylinders is therefore possible solely by analyzing signal characteristic S2 of the second knock sensor. Since in the crank angle ranges in which a tendentially stronger acoustic signal is measured in FIG. 2, it is always the case that a weaker acoustic signal is measured in FIG. 3, an assignment of the knock sensors to the cylinder banks is implementable also by comparing the signals of FIG. 3 with those of FIG. 3. To this end, the signal strengths of knock sensor 1 are simply compared to the signal strengths of knock sensor 2 in the respective same crank angle range. In the same way as in the evaluation of only one knock sensor, this comparison of the signal strengths may be implemented by considering the peak values or by considering the energy, using the already described methods.

If only one signal sequence is analyzed, signals from different cylinders at a single acceleration sensor are therefore compared to each other. Since both measurements are carried out by one and the same knock sensor, the measured signals are not affected by different sensitivities of the knock sensors. However, differences arise due to the fact that the generation of the characteristic signals may possibly differ from cylinder to cylinder. In the comparison of the signals from two knock sensors, signals that come from the same cylinder are compared. In this case there are of course no differences in the generation of the characteristic signals in the cylinders. Nevertheless, differences may result from the fact that knock sensors 1, 2 or, for instance, the coupling of the knock sensors to internal combustion engine 10, have different strength.

An assignment of knock sensors to cylinders of the internal combustion engine may be useful for different reasons. For one, it may generally be provided that a check of the assignment of knock sensors to the cylinders take place upon each start of the internal combustion engine in order to thereby ensure that an optimal assignment of knock sensors to the cylinders has been established in every operating state. However, this requires continuous occupation of engine control device 3 with this task, which is not always desirable for reasons of computation time. As an alternative, it is also possible to provide the assignment of knock sensors 1, 2 only for particular occasions, for instance directly after finishing the vehicle in the factory or during repairs. As an alternative, it would also be possible to check the assignment from time to time or when, due to knock detection, there is the suspicion that the assignment of the knock sensors to the cylinders may be faulty.

What is claimed is:

1. A device for assigning at least two knock sensors to at least two cylinders of an internal combustion engine, the internal combustion engine having a working cycle in which an individual characteristic acoustic signal is generated for each cylinder, the knock sensors being configured to analyze the acoustic signals, the device comprising:

means for assigning the knock sensors to the cylinders by comparing at least two of the characteristic acoustic signals.

2. The device according to claim 1, wherein the means analyzes at least one signal from a first cylinder and at least one signal from a second cylinder, which both come from the same knock sensor.

3. The device according to claim 1, wherein the means analyzes at least one signal from a first knock sensor and at least one signal from a second knock sensor, which both come from the same cylinder.

4. The device according to claim 1, wherein the means implements the assignment of the knock sensors to the cylinders on the basis of a request signal from a source external to the internal combustion engine or upon each operation of the internal combustion engine.

5. The device according to claim 1, wherein the means compares a signal strength of the characteristic acoustic signals.

6. The device according to claim 5, wherein the means determines the signal strength by considering energy.

7. A method for assigning at least two knock sensors to at least two cylinders of an internal combustion engine, the internal combustion engine having a working cycle in which an individual characteristic acoustic signal is generated for each cylinder, the knock sensors being configured to analyze the acoustic signals, the method comprising:

performing a comparison of at least two of the characteristic acoustic signals for the assignment of the knock sensors to the cylinders.

8. The method according to claim 7, further comprising comparing a signal strength of the characteristic acoustic signals.

9. The method according to claim 7, further comprising analyzing at least one signal from a first cylinder and at least one signal from a second cylinder, which both come from the same knock sensor.

10. The method according to claim 7, further comprising analyzing at least one signal from a first knock sensor and at least one signal from a second knock sensor, which both come from the same cylinder.

* * * * *